(12) United States Patent
Kang et al.

(10) Patent No.: US 8,031,151 B2
(45) Date of Patent: Oct. 4, 2011

(54) DISPLAY SUBSTRATE AND DISPLAY PANEL HAVING THE SAME

(75) Inventors: Shin-Tack Kang, Gyeonggi-do (KR); Hyeong-Jun Park, Chungcheongnam-do (KR); Beom-Jun Kim, Seoul (KR); Jong-Oh Kim, Chungcheongnam-do (KR); Jong-Hyuk Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 978 days.

(21) Appl. No.: 11/982,673

(22) Filed: Nov. 2, 2007

(65) Prior Publication Data

US 2008/0136760 A1 Jun. 12, 2008

(30) Foreign Application Priority Data

Nov. 3, 2006 (KR) ........................ 10-2006-0108273

(51) Int. Cl.
G09G 3/36 (2006.01)
(52) U.S. Cl. ............................ 345/93; 345/92
(58) Field of Classification Search ............ 345/87–104; 315/169.1–169.4
See application file for complete search history.

(56) References Cited

U.S. PATENT DOCUMENTS

| | | | | |
|---|---|---|---|---|
| 7,038,753 B2 * | 5/2006 | Kim | ............................... | 349/139 |
| 7,671,942 B2 * | 3/2010 | Nam et al. | ..................... | 349/114 |
| 7,750,986 B2 * | 7/2010 | Chung et al. | ..................... | 349/39 |
| 7,768,583 B2 * | 8/2010 | Kim | ................................ | 349/39 |
| 2005/0007534 A1 * | 1/2005 | Kim | ............................... | 349/139 |

FOREIGN PATENT DOCUMENTS

| | | |
|---|---|---|
| KR | 10-2005-0121882 | 12/2005 |
| KR | 10-2006-0034029 | 4/2006 |

OTHER PUBLICATIONS

Korean Patent Abstracts, Publication No. 1020050121882, Dec. 28, 2005, 1 p.
Korean Patent Abstracts, Publication No. 1020060034029, Apr. 21, 2006, 1 p.

* cited by examiner

*Primary Examiner* — Vijay Shankar
(74) *Attorney, Agent, or Firm* — Innovation Counsel LLP

(57) ABSTRACT

A display substrate includes a base substrate, a first storage electrode, a second storage electrode, a first insulating layer, a first spacing member and a second spacing member. The base substrate includes a first pixel region and a second pixel region that are defined by a plurality of gate lines and a plurality of source lines extended in a direction different from an extended direction of the gate lines. The first storage electrode is in the first pixel region. The second storage electrode is in the second pixel region. The first insulating layer covers the first storage electrode, and has a recessed portion on the second storage electrode. The first spacing member is on the first insulating layer corresponding to the first storage electrode. The second spacing member is on the recessed portion.

28 Claims, 9 Drawing Sheets

DISPLAY SUBSTRATE AND DISPLAY PANEL HAVING THE SAME

CROSS-REFERENCE TO RELATED APPLICATIONS

The present application claims priority from Korean Patent Application No. 10-2006-108273, filed on Nov. 3, 2006, the disclosure of which is hereby incorporated herein by reference in its entirety.

BACKGROUND OF THE INVENTION

1. Field of the Invention

The present invention relates to a display substrate and a display panel having the display substrate. More particularly, the present invention relates to a display substrate having improved mechanical strength, decreased light leakage, and a display panel having the display substrate.

2. Description of the Related Art

A liquid crystal display (LCD) device includes an LCD panel having a thin film transistor (TFT) substrate, a color filter substrate and a liquid crystal layer. The color filter substrate faces the TFT substrate. The liquid crystal layer is interposed between the TFT substrate and the color filter substrate, and an orientation of liquid crystal molecules of the liquid crystal layer is varied in response to an electric field formed by an electric signal, thus, light transmittance of the liquid crystal layer is changed. A column spacer is formed between the TFT substrate and the color filter substrate to maintain a gap between the TFT substrate and the color filter substrate. A liquid crystal layer is interposed between the TFT substrate and the color filter substrate.

When a plurality of column spacers having a constant height are formed on substantially the entire area of the LCD panel, an acceptable height variation of a liquid crystal receiving space is determined by compressibility of the column spacers. When a cell-gap of the liquid crystal layer is restricted by the compressibility of the column spacers, the height margin is restricted by the compressibility of the column spacer.

In addition, when friction caused by the compression of the column spacers having the constant height is increased, the column spacers do not recover their original shape which increases light leakage caused by the compression of the column spacers

SUMMARY OF THE INVENTION

The present invention provides a display substrate capable of improving mechanical strength and decreasing light leakage.

The present invention also provides a display panel having the display substrate.

A display substrate in accordance with one aspect of the present invention includes a base substrate, a first storage electrode, a second storage electrode, a first insulating layer, a first spacing member and a second spacing member. The base substrate includes a first pixel region and a second pixel region that are defined by a plurality of gate lines and a plurality of source lines extended in a direction different from an extended direction of the gate lines. The first storage electrode is in the first pixel region. The second storage electrode is in the second pixel region. The first insulating layer covers the first storage electrode, and has a recessed portion on the second storage electrode. The first spacing member is on the first insulating layer corresponding to the first storage electrode. The second spacing member is on the recessed portion.

A display panel in accordance with another aspect of the present invention includes a first display substrate, a second display substrate and a liquid crystal layer. The first display substrate includes a plurality of pixel regions defined by a plurality of gate lines and a plurality of source lines. The first display substrate includes a first storage electrode in a first pixel region, a second storage electrode in a second pixel region and a first insulating layer covering the first storage electrode. The first insulating layer has a recessed portion on the second storage electrode. The second display substrate is combined with the first display substrate to interpose a liquid crystal layer. The first spacing member is on the first storage electrode to maintain a cell-gap between the first and second substrates. The second spacing member is in a region corresponding to the recessed portion. An end portion of the second spacing member is spaced apart from the first display substrate or the second display substrate by a constant distance.

A display substrate in accordance with another aspect of the present invention includes a base substrate, a first switching element, a first metal electrode, a second switching element, a second metal electrode, a first insulating layer, a first spacing member and a second spacing member. The base substrate includes a plurality of gate lines and a plurality of source lines extended in a direction different from an extended direction of the gate lines. The first switching element is electrically connected to an n-th gate line and an m-th source line. The first metal electrode is extended from an output electrode of the first switching element. The second switching element is electrically connected to the n-th gate line and an (m+k)-th source line. The second metal electrode is electrically connected to an output electrode of the second switching element. The first insulating layer covers the first metal electrode, the first insulating layer having a recessed portion on the second metal electrode. The first spacing member is on the first insulating layer corresponding to the first metal electrode. The second spacing member is in the recessed portion, wherein n, m and k are natural numbers.

A display panel in accordance with another aspect of the present invention includes a first display substrate, a second display substrate, a first spacing member and a second spacing member. The first display substrate includes a plurality of gate lines, a plurality of source lines, a first switching element, a first metal electrode, a second switching element, a second metal electrode and a first insulating layer. The source lines are extended in a direction different from an extended direction of the gate lines. The first switching element is electrically connected to an n-th gate line and an m-th source line. The first metal electrode is extended from an output electrode of the first switching element. The second switching element is electrically connected to the n-th gate line and an (m+k)-th source line. The second metal electrode is extended from an output electrode of the second switching element. The first insulating layer covers the first metal electrode, and has a recessed portion on the second metal electrode. The second display substrate is combined with the first display substrate to interpose a liquid crystal layer. The first spacing member is formed in a region corresponding to the first metal electrode to maintain a cell-gap between the first and second display substrates. The second spacing member is formed in a region corresponding to the recessed portion. An end portion of the second spacing member is spaced apart from the first display substrate or the second display substrate by a constant distance.

According to the present invention, the display panel includes the first and second spacing members to increase a liquid crystal dropping margin. In addition, light leakage caused by compression is decreased.

BRIEF DESCRIPTION OF THE DRAWINGS

The above and other advantages of the present invention will become more apparent in light of following detailed description of several embodiments with reference to the accompanying drawings, in which.

DESCRIPTION OF THE EMBODIMENTS

Figure 1:
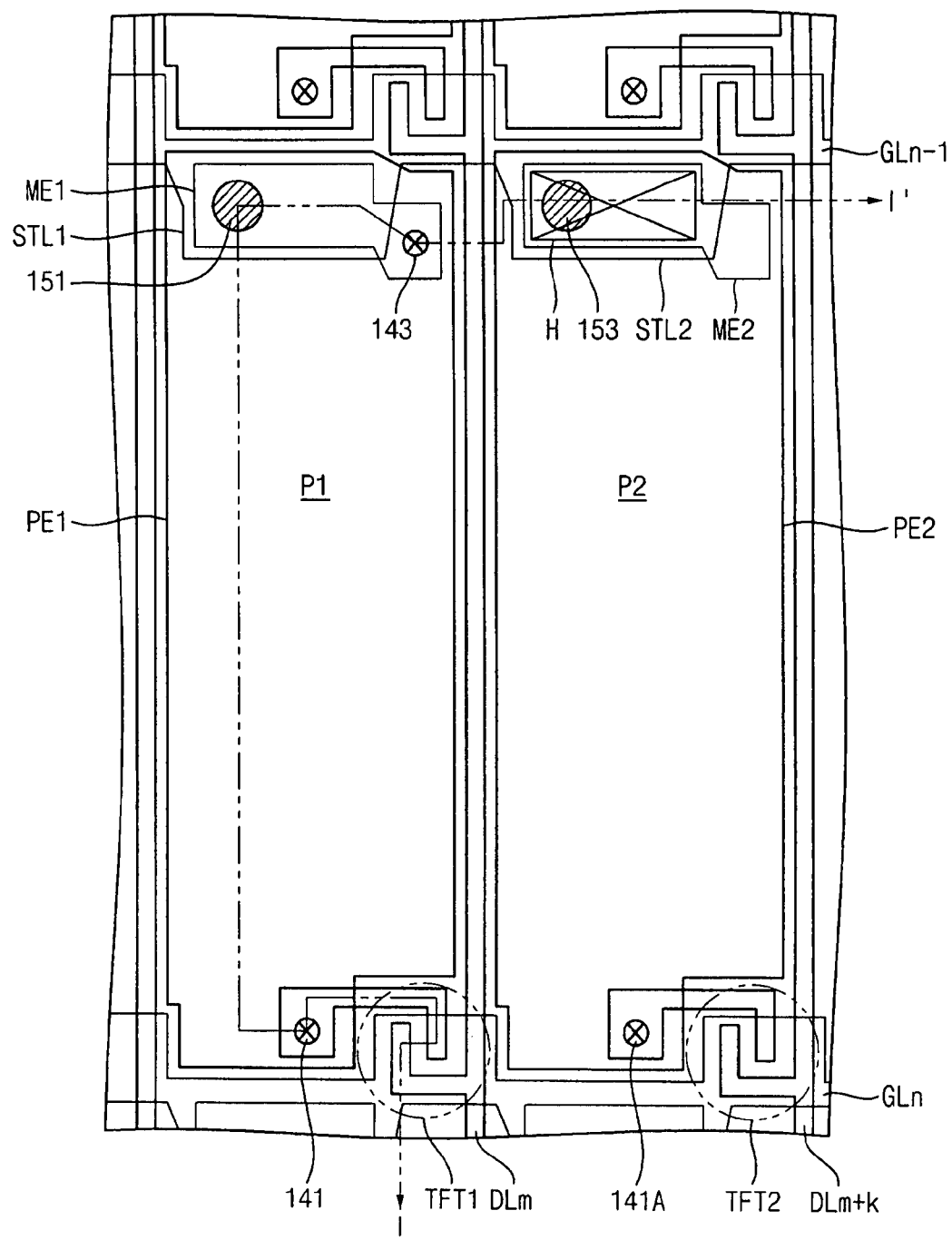
FIG. 1 is a plan view illustrating a display panel in accordance with one embodiment of the present invention.

The invention is described below more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

FIG. 1 is a plan view illustrating a display panel in accordance with one embodiment of the present invention.

Referring to FIG. 1, the display panel includes a display substrate that includes a plurality of gate lines GLn-1 and GLn and a plurality of source data DLm and DLm+k that extend in a direction different from the gate lines GLn-1 and GLn. The gate lines GLn-1 and GLn and the data lines DLm and DLm+k define a plurality of pixel regions. A plurality of pixel parts is formed in the pixel regions, respectively. A plurality of storage capacitors of an end gate type is formed in the pixel parts, respectively. Also, n, m and k are natural numbers.

For example, a first pixel part P1 is formed in a first pixel region. The first pixel part P1 includes a first switching element TFT1, a first storage electrode STL1, a first metal electrode ME1 and a first pixel electrode PE1. The first switching element TFT1 is electrically connected to n-th gate line and m-th data line DLm. The first storage electrode STL1 extends from (n−1)-th gate line GLn-1. The first metal electrode ME1 is partially overlaps the first storage electrode STL1.

The first pixel electrode PE1 is formed in a first pixel region. The first pixel electrode PE1 is electrically connected to the first switching element TFT1 through a first contact hole 141. The first pixel electrode PE1 is electrically connected to the first metal electrode ME1 through a second contact hole 143. For example, the second contact hole 143 is on a portion of the first metal electrode ME1, and is not on the overlapped portion between the first metal electrode ME1 and the first storage electrode STL1. Thus, a first storage capacitor including the first storage electrode STL1, the first metal electrode ME1 and the first pixel electrode PE1 is formed.

A first spacing member 151 is formed on the first pixel electrode PE1 that overlaps the first metal electrode ME1. The first spacing member 151 maintains a cell gap between the display substrate and an opposite substrate of the display panel.

A second pixel part P2 is formed in a second pixel region. The second pixel part P2 includes a second switching element TFT2, a second storage electrode STL2, a second metal electrode ME2 and a second pixel electrode PE2. The second switching element TFT2 is electrically connected to the n-th gate line and (m+k)-th source line DLm+k.

The second storage electrode STL2 extends from the (n−1)-th gate line GLn-1. The second metal electrode ME2 overlaps the second storage electrode STL2. A recessed portion H is formed on the second metal electrode ME2 that overlaps with the second storage electrode STL2.

The second pixel electrode PE2 is formed in the second pixel region. The second pixel electrode PE2 is electrically connected to the second switching element TFT2 through a contact hole 141A. The second pixel electrode PE2 is electrically connected to the second metal electrode ME2 through the recessed portion H. Thus, a second storage capacitor including the second storage electrode STL2, the second metal electrode ME2 and the second pixel electrode PE2 is formed.

A second spacing member 153 is formed on the second pixel electrode PE2 on which the recessed portion H is formed. An end portion of the second spacing member 153 is spaced apart from the opposite substrate.

For example, the second spacing member 153 is formed in the recessed portion H that is recessed with respect to a region in which the first spacing member 151 is formed so that the end portion of the second spacing member 153 is spaced apart from the opposite substrate by a recessed amount of the recessed portion H.

The display panel including the display substrate includes the first and second spacing members 151 and 153 having different heights from each other to increase a liquid crystal receiving space that is a dropping margin.

In addition, the opposite substrate facing the end portions of the first and second spacing members 151 and 153 has substantially flat surfaces so that the first and second spacing members 151 and 153 may easily recover original shape although the first and second spacing members 151 and 153 are compressed. Thus, the light leakage caused by the compression is decreased.

The second pixel part P2 may be adjacent to the first pixel part P1. Alternatively, the second pixel part P2 may be spaced apart from the first pixel part P1. For example, the first and second spacing members 151 and 153 may be formed on adjacent pixel parts, respectively. Alternatively, the first and second spacing members 151 and 153 may be respectively formed on the pixel parts spaced apart from each other. A position of each of the first and second spacing members 151 and 153 in each of the pixel parts P1 and P2 may be substantially the same. For example, each of the first and second spacing members 151 and 153 may be formed on the storage electrode. Thus, credibility of testing the first and second spacing members is increased.

Figure 2:
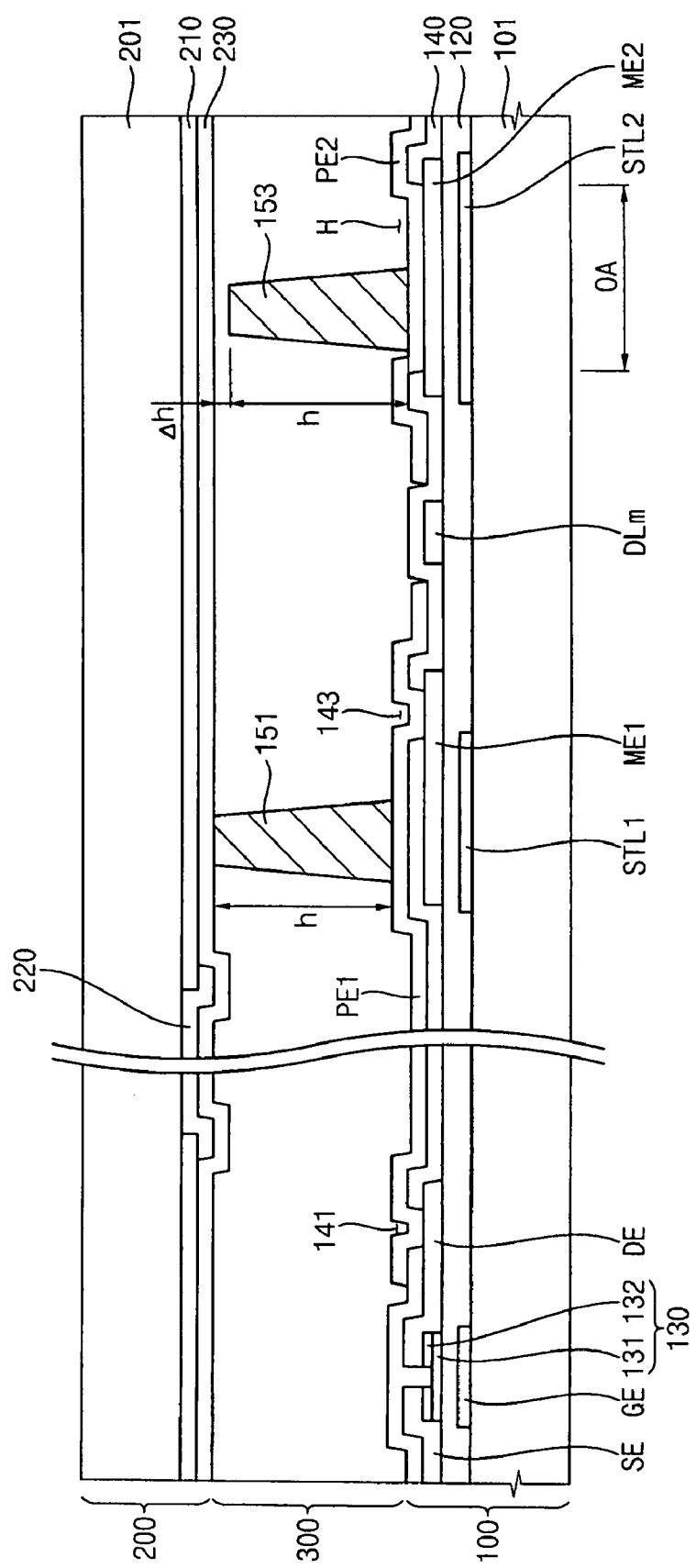
FIG. 2 is a cross-sectional view taken along a line I-I' shown in FIG. 1.

FIG. 2 is a cross-sectional view taken along a line I-I' shown in FIG. 1.

Referring to FIGS. 1 and 2, the display panel includes a first display substrate 100, a second display substrate 200 and a liquid crystal layer 300.

The first display substrate 100 includes a first base substrate 101. A gate metal layer is formed on the first base substrate 101, and the gate metal layer is patterned to form a gate pattern that includes a gate electrode GE, a plurality of gate lines GLn-1 and GLn and a plurality of storage electrodes STL1 and STL2. The storage electrodes STL1 and STL2 extend from the gate lines GLn-1 and GLn.

A gate insulating layer 120 having a thickness of about 4000 Å is formed on the gate pattern. A channel layer 130 is formed on the gate insulating layer 120 corresponding to the gate electrode GE. The channel layer 130 includes an active layer 131 and an ohmic contact layer 132. The active layer 131 includes an amorphous silicon (a-Si) layer. The ohmic contact layer 132 includes an N+ amorphous silicon (N+ a-Si) layer. For example, N+ ions are implanted into amorphous silicon at a high concentration to form the N+ amorphous silicon layer. The gate electrode GE is a control electrode that controls the driving of a switching element based on a control signal.

A source metal layer is formed on the first base substrate 101 on which the channel layer 130 is formed. The source metal layer is patterned to form a source pattern that includes a source electrode SE, a drain electrode DE, a first metal electrode ME1, a second metal electrode ME2 and a plurality of data lines DLm and DLm+k. The source electrode SE is an input electrode through which a data signal is applied to the switching element. The drain electrode DE is an output electrode through which an output signal corresponding to the data signal is output from the switching element.

A passivation layer 140 of a thickness of about 2000 Å is formed on the source pattern. The passivation layer 140 is patterned to form a first contact hole 141 and a second contact hole 143 through which the drain electrode DE and the first metal electrode ME2 are partially exposed, respectively. In addition, a recessed portion H that overlaps the second storage electrode STL2 is formed on the second metal electrode ME2 by removing a portion of passivation layer 140 above metal electrode ME2. For example, a size of the recessed portion H may be substantially the same as a size of an overlapped region between the second storage electrode STL2 and the second metal electrode ME2.

A first pixel electrode PE1 and a second pixel electrode PE2 are formed on the passivation layer 140 having the recessed portion H, the first contact hole 141 and the second contact hole 143.

For example, the drain electrode DE is electrically connected to the first pixel electrode PE1 through the first contact hole 141, and the first metal electrode ME1 is electrically connected to the first pixel electrode PE1 through the second contact hole 143.

The second metal electrode ME2 is electrically connected to the second pixel electrode PE2 through the recessed portion H. The second pixel electrode PE2 is electrically connected to a drain electrode (not shown) of the second switching element TFT2 through the first contact hole 141.

A photoresist organic layer is formed on the first base substrate 101 on which the first and second pixel electrodes PE1 and PE2 are formed. The photoresist organic layer is patterned to form a first spacing member 151 and a second spacing member 153 on the first base substrate 101 on which the first and second pixel electrodes PE1 and PE1 are formed. For example, the photoresist organic layer includes negative photoresist. Alternatively, the photoresist organic layer may include positive photoresist. The first and second spacing members 151 and 153 may have substantially the same size.

The first spacing member 151 is formed on the pixel electrode PE1 above the first storage electrode STL1, and the second spacing member 153 is formed on the second pixel electrode PE2 in the recessed portion H. For example, the second spacing member 153 may be formed in a portion of the recessed portion H.

Although the first and second spacing members 151 and 153 have substantially the same size, a height of a bottom surface of the first spacing member 151 is different from a height of a bottom surface of the second spacing member 153 with respect to a lower surface of the first base substrate 101. Thus, a height of an end portion of the first spacing member 151 is greater than a height of an end portion of the second spacing member 153. A height difference between the end portions of the first and second spacing members 151 and 153 is substantially the same as the thickness of the passivation layer 140 which is about 2000 Å.

The second display substrate 200 includes a second base substrate 201. A light blocking pattern 210 is formed on the second base substrate 201. The light blocking pattern 210 divides the second base substrate 201 into a transmission region through which light passes and a reflection region from which light is reflected. The light blocking pattern 210 corresponds to the gate lines GLn-1 and GLn, the source lines DLm and DLm+k, the first switching element TFT1 and the second switching element TFT2.

A color filter layer 220 is formed on the transmission region defined by the light blocking pattern 210. The color filter layer 220 includes a red color filter, a blue color filter and a green color filter.

A common electrode 230 facing the first and second pixel electrodes PE1 and PE2 are formed on the color filter layer 220. Thus, a first liquid crystal capacitor of the first pixel part P1 is defined by the first pixel electrode PE1, the liquid crystal layer 300 and the common electrode 230. In addition, a second liquid crystal capacitor of the second pixel part P2 is defined by the second pixel electrode PE2, the liquid crystal layer 300 and the common electrode 230.

The display panel includes the first and second spacing members 151 and 153, respectively, having different heights with respect to the lower surface of the first base substrate 101 to increase a liquid crystal receiving space (dropping margin) of the liquid crystal layer 300.

In addition, the second display substrate 200 has a substantially flat surface. Thus, the first and second spacing members 151 and 153 may easily recover original position, although the first and second spacing members 151 and 153 are deformed by the compression. Therefore, the light leakage caused by the compression is decreased.

Figure 3A:
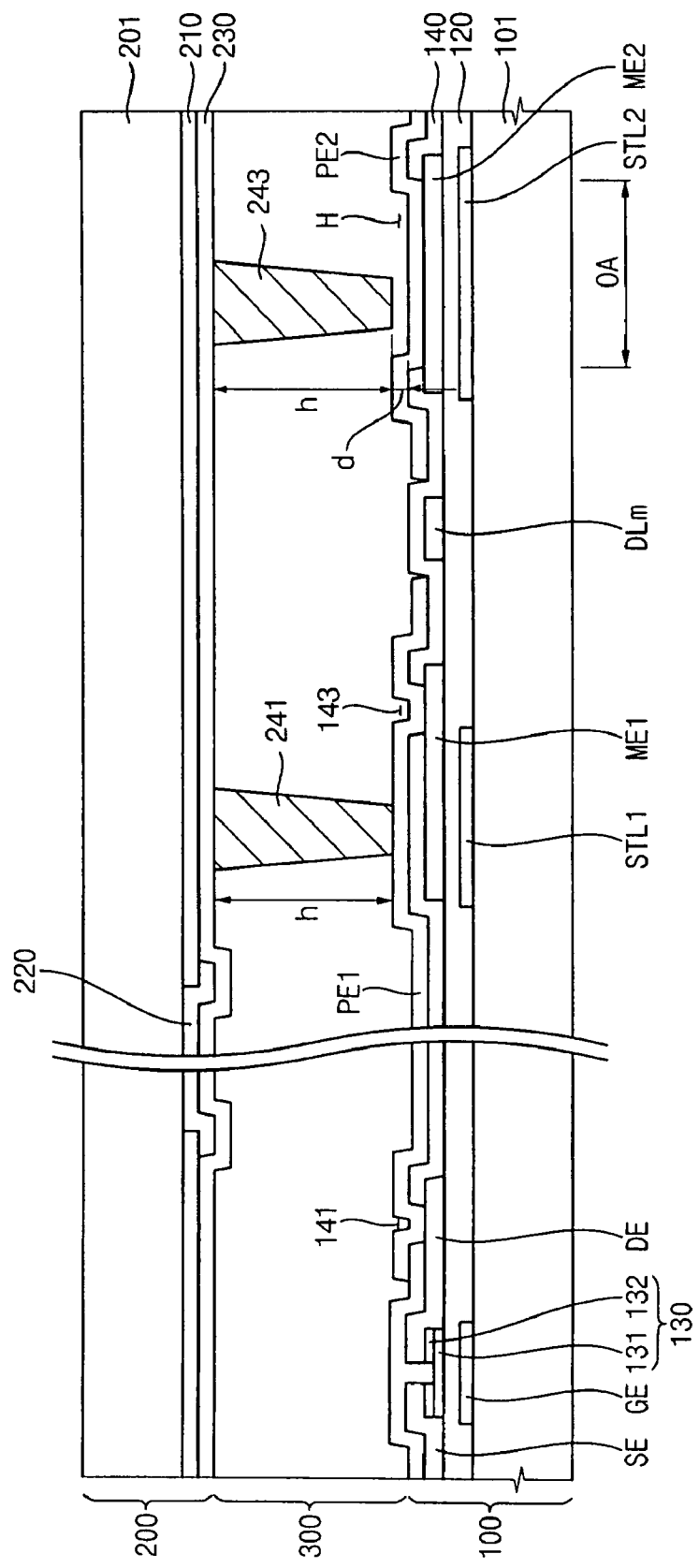
FIGS. 3A and 3B are cross-sectional views illustrating a display panel in accordance with another embodiment of the present invention.
Figure 3B:
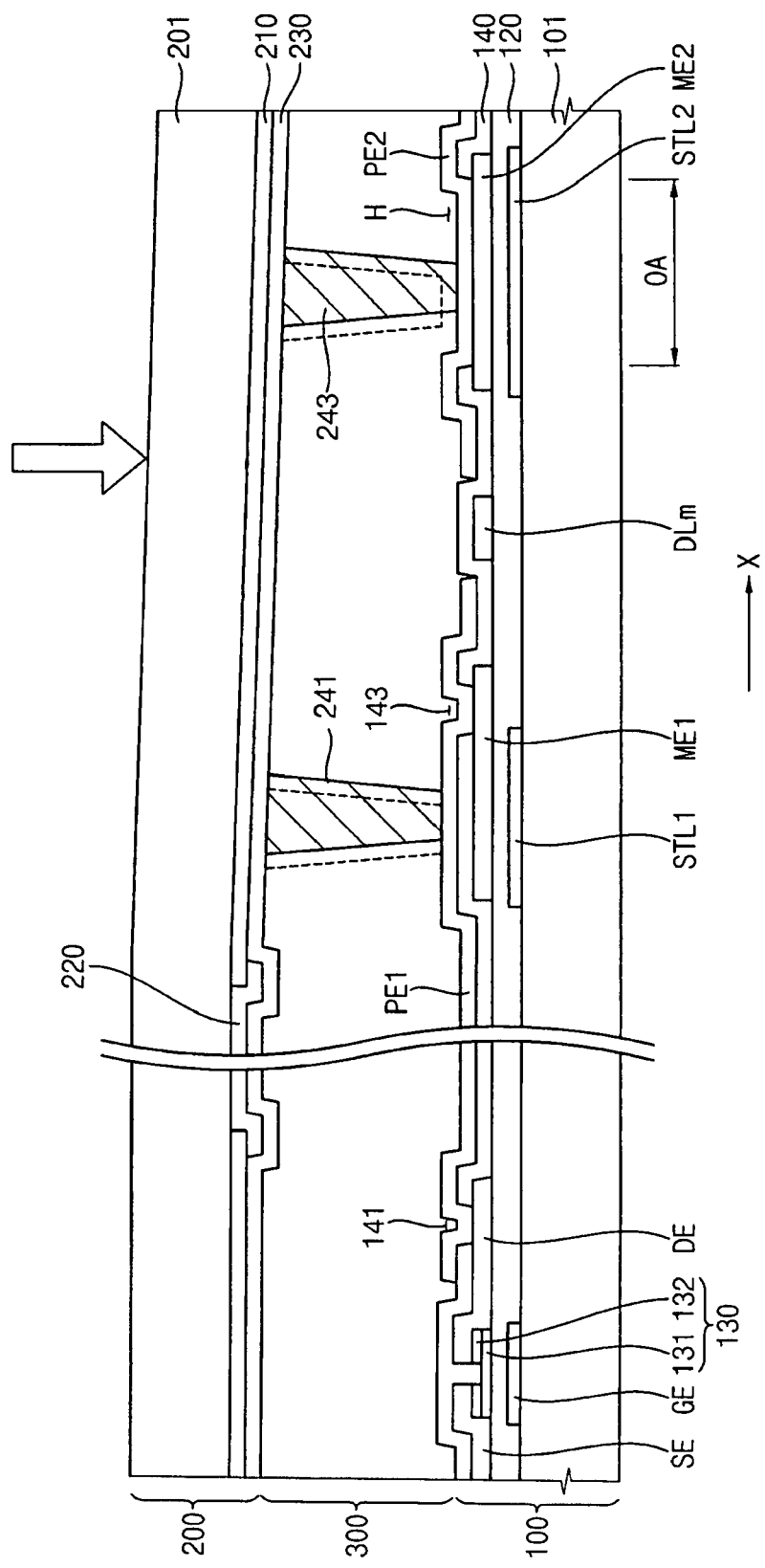

FIGS. 3A and 3B are cross-sectional views illustrating a display panel in accordance with another embodiment of the present invention. The display panel of FIGS. 3A and 3B is the same as in FIGS. 1 and 2 except for a first spacing member and a second spacing member. Thus, the same reference numerals will be used to refer to the same or like parts as those described in FIGS. 1 and 2 and further explanation concerning the above elements is not required.

Referring to FIGS. 3A and 3B the display panel includes a second display substrate 200 having the first spacing member 241 and the second spacing member 243.

For example, a light blocking pattern 210, a color filter layer 220 and a common electrode 230 are formed on the second base substrate 201, in sequence. A photoresist organic layer is formed on the common electrode 230, and the photoresist organic layer is patterned to form the first and second spacing members 241 and 243. The photoresist organic layer includes negative photoresist. Alternatively, the photoresist organic layer may include positive photoresist. The first and second spacing members 241 and 243 may have substantially the same size. For example, a distance 'h' between a lower surface and an upper surface of each of the first and second spacing members 241 and 243 may be substantially the same.

The first spacing member 241 is formed above first storage electrode STL1, and the second spacing member 243 is formed above the recessed portion H. For example, the second spacing member 243 may be formed on an overlapped portion between the second storage electrode STL2 and a second metal electrode ME2.

The distance 'h' between the lower and upper surfaces of each of the first and second spacing members 241 and 243 is constant, and the second spacing member 243 is formed in the recessed portion H. Thus, an end portion of the first spacing member 241 makes contact with the first display substrate 100, and an end portion of the second spacing member 243 is spaced apart from the first display substrate 100 by a distance 'd'. The distance 'd' between the second spacing member 243 and the first display substrate 100 may be substantially the same as a depth of the recessed portion H. For example, the distance 'd' may be substantially the same as a thickness of the passivation layer 140, which may be about 2000 Å.

Therefore, the display panel includes the first and second spacing members 241 and 243 to increase a liquid crystal receiving space (dropping margin) for forming the liquid crystal layer 300.

FIG. 3B is a cross-sectional view illustrating the display panel of FIG. 3A, which is compressed by an externally provided pressure.

Referring to FIG. 3B, when the display panel is compressed, the first and second spacing members 241 and 243 may be shifted in an X-direction. In FIGS. 3A and 3B, the first and second spacing members 241 and 243 are formed on the first storage electrode STL1 and the recessed portion H to easily recover original position, although the first and second spacing members 241 and 243 are shifted in the X-direction. Thus, the light leakage caused by the compression is decreased.

According to the display panel of FIGS. 3A and 3B, the liquid crystal dropping margin is increased, and the light leakage is decreased.

Figure 4:
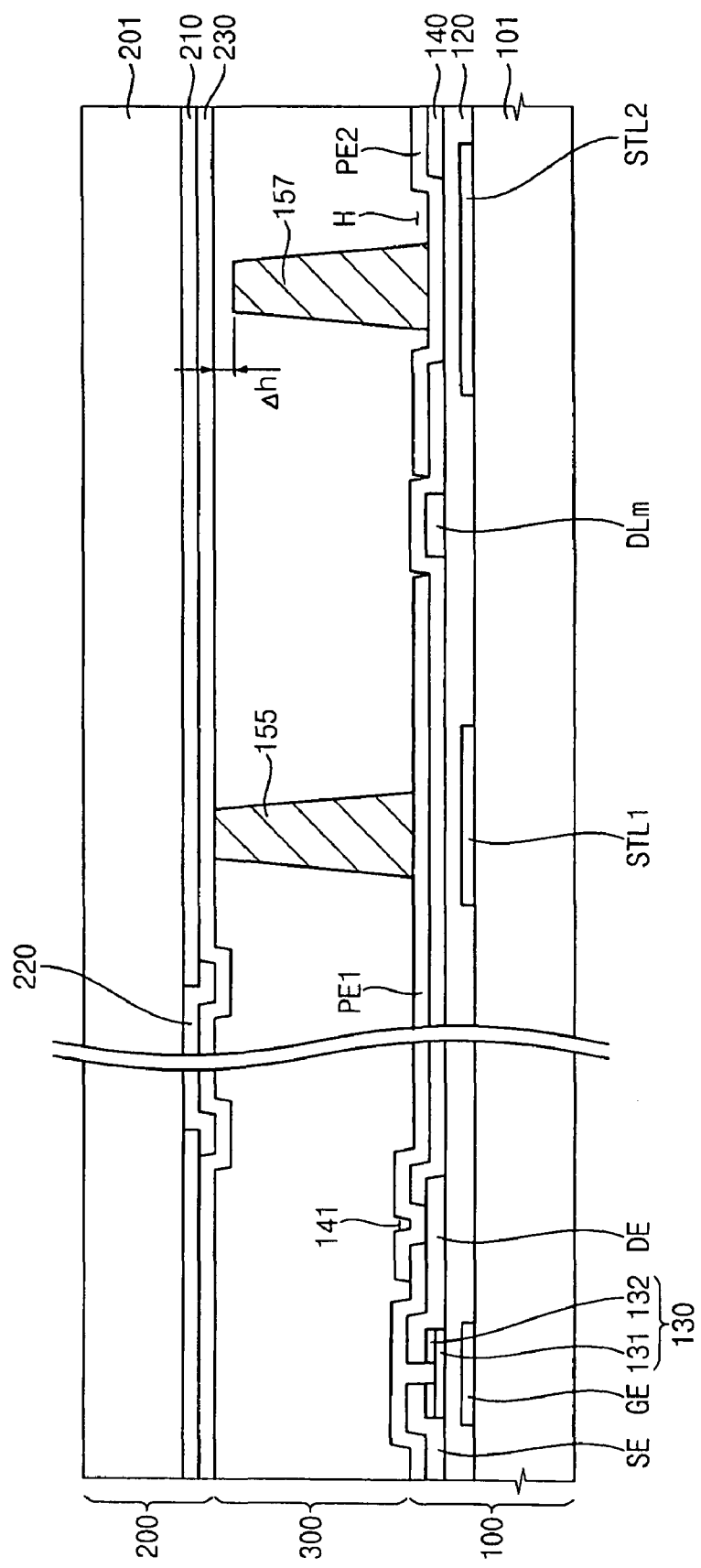
FIG. 4 is a cross-sectional view illustrating a display panel in accordance with another embodiment of the present invention.

FIG. 4 is a cross-sectional view illustrating a display panel in accordance with another embodiment of the present invention. The display panel of FIG. 4 is the same as in FIGS. 1 and 2 except for a first metal electrode and a second metal electrode. Thus, the same reference numerals will be used to refer to the same or like parts as those described in FIGS. 1 and 2 and any further explanation concerning the above elements is not required.

Referring to FIG. 4, a first storage capacitor of a first pixel part P1 includes a first storage electrode STL1, a gate insulating layer 120, a passivation layer 140 and a first pixel electrode PE1.

A second storage capacitor of the second pixel part P2 includes a second storage electrode STL2, the gate insulating layer 120 and a second pixel electrode PE2. The passivation layer 140 on the second storage electrode STL2 is partially patterned using a slit mask to form a recessed portion H above the second storage electrode STL2. The gate insulating layer 120 is electrically connected to the second pixel electrode PE2 through the recessed portion H.

A height of the first spacing member 155 formed on the first storage electrode STL1 is greater than a height of the second spacing member 157 formed in the recessed portion H by a height difference Δh.

According to the display panel shown in FIG. 4, the display panel includes the first and second spacing members 155 and 157 having different heights so that a liquid crystal receiving space (dropping margin) for forming a liquid crystal layer 300 is increased. In addition, the second display substrate 200 has substantially the flat surface so that the first and second spacing members 155 and 157 may easily recover original position, although the first and second spacing members 155 and 157 are shifted by an externally provided compression. Thus, light leakage caused by the compression is decreased.

Figure 5:
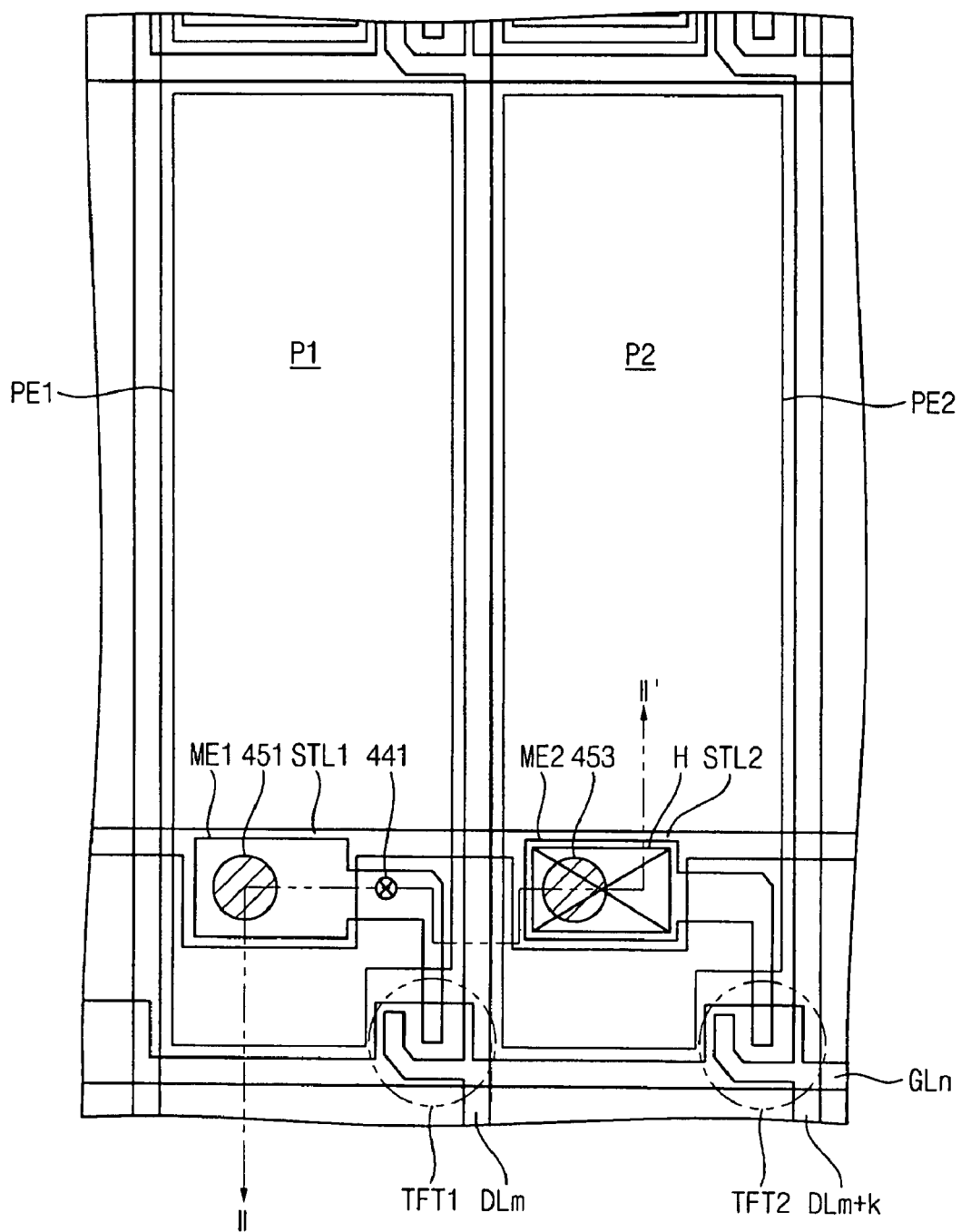
FIG. 5 is a plan view illustrating a display panel in accordance with another embodiment of the present invention.
Figure 6:
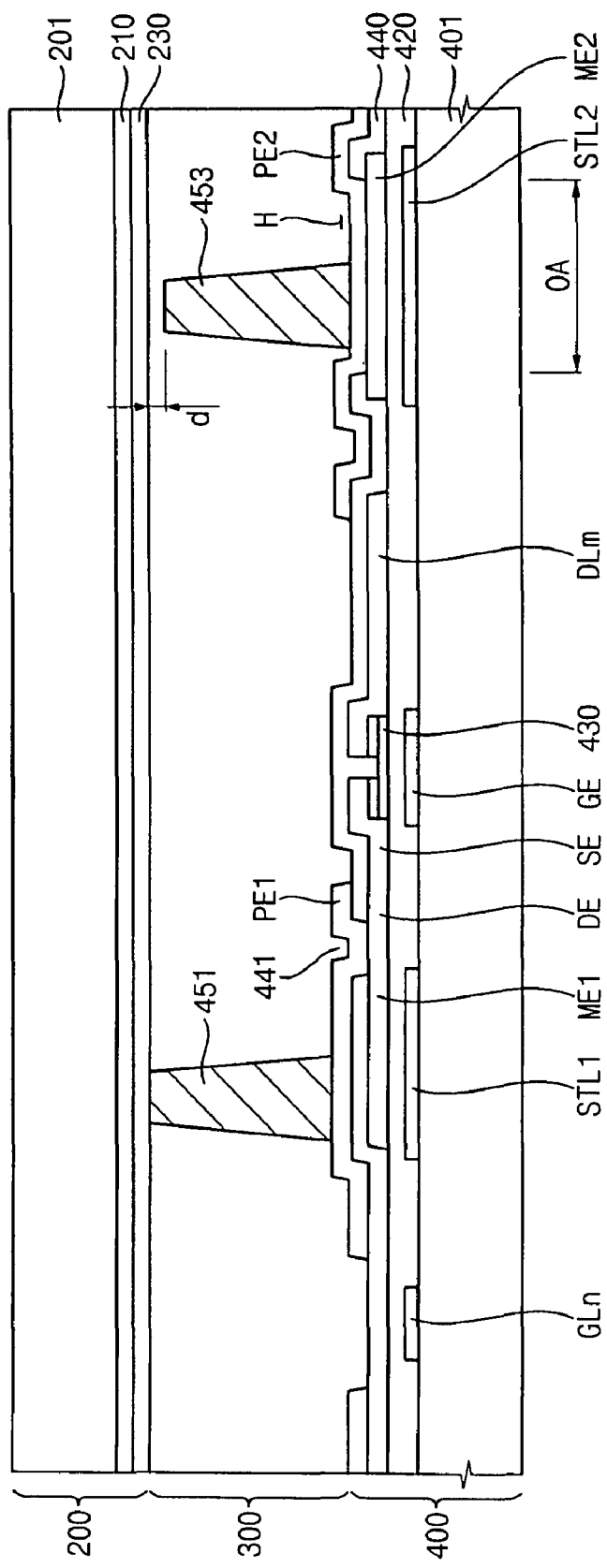
FIG. 6 is a cross-sectional view taken along a line II-II' shown in FIG. 5.

FIG. 5 is a plan view illustrating a display panel in accordance with another embodiment of the present invention. FIG. 6 is a cross-sectional view taken along a line II-II' shown in FIG. 5. The display panel of FIGS. 5 and 6 is the same as in FIGS. 1 and 2 except for a first display substrate. Thus, the same reference numerals will be used to refer to the same or like parts as those described in FIGS. 1 and 2 and any further explanation concerning the above elements is not required.

Referring to FIGS. 5 and 6, the first display substrate 400 includes a plurality of gate lines GLn-1 and GLn and a plurality of data lines DLm and DLm+k. The data lines DLm and DLm+k may be extended in a direction different from an extended direction of the gate lines GLn-1 and GLn. A plurality of pixel regions is defined by the gate lines GLn-1 and GLn and the data lines DLm and DLm+k. A plurality of pixel parts is formed in the pixel regions, respectively. A plurality of storage capacitors of an independent storage capacitor line type is formed in the pixel parts, respectively.

For example, a first pixel part P1 is formed in a first pixel region. The first pixel part P1 includes a first switching element TFT1, a first storage electrode STL1, a first metal electrode ME1 and a first pixel electrode PE1. The first storage electrode STL1 is electrically connected to a plurality of storage electrodes formed in adjacent pixel parts to receive a common voltage. A first metal electrode ME1 is partially overlapped on the first storage electrode STL1.

The first switching element TFT1 includes a gate electrode GE, a source electrode SE and a drain electrode DE. The gate electrode GE is electrically connected to the n-th gate line GLn. The source electrode SE is electrically connected to the m-th data line DLm. The drain electrode DE is electrically connected to the first pixel electrode PE1. The gate electrode GE is a control electrode receiving a control signal. The source electrode SE is an input electrode receiving a data signal. The drain electrode DE is an output electrode through which an output signal is output based on the data signal.

The first storage electrode STL1 is in the first pixel region adjacent to the n-th gate line GLn.

The first metal pattern ME1 extends from the drain electrode DE of the first switching element TFT1 and overlaps the first storage electrode STL1. A passivation layer 440 is formed on the first metal electrode ME1. The first metal electrode ME1 is electrically connected to the first pixel electrode PE1 through a first contact hole 441 that is formed through the passivation layer 440. For example, the first contact hole 441 is formed on a portion of the first metal electrode ME1, and does not overlap any portion between the first metal pattern ME1 and the first storage electrode STL1.

A first storage capacitor of the first pixel part P1 includes the first storage electrode STL1, a gate insulating layer 420, the first metal electrode ME1, the passivation layer 440 and the first pixel electrode PE1.

A first spacing member 451 is formed on the first pixel electrode PE1 that partially overlaps the first metal electrode ME1. An end portion of the first spacing member 451 makes contact with a second display substrate 200 to maintain a cell gap between the first and second display substrates 400 and 200.

The second pixel part P2 is formed in a second pixel region. The second pixel part P2 includes a second switching element TFT2, a second storage electrode STL2 and a second pixel electrode PE2.

The second switching element TFT2 includes a gate electrode electrically connected to the n-th gate line GLn, a source electrode electrically connected to the (m+k)-th data line DLm+k and a drain electrode electrically connected to the second pixel electrode PE2.

The second storage electrode STL2 is formed in a second pixel region adjacent to the n-th gate line GLn, and is electrically connected to a plurality of storage electrodes of adjacent pixel parts through a common line.

The second metal electrode ME2 extends from the drain electrode of the second switching element TFT2 and overlaps with the second storage electrode STL2 on the second metal electrode ME2. The passivation layer 440 is partially removed to form a recessed portion H on the second metal electrode ME2 that is overlapped with the second storage electrode STL2.

The second pixel electrode PE2 is formed in the second pixel region, and is electrically connected to the second switching element TFT2. The second pixel electrode PE2 is electrically connected to the second metal electrode ME2 through the recessed portion H. A second storage capacitor of the second pixel part P2 includes the second storage electrode STL2, the gate insulating layer 420, the second metal electrode ME2, the passivation layer 440 and the second pixel electrode PE2.

A second spacing member 453 is formed on the second pixel electrode PE2 that is formed in the recessed portion H. The recessed portion H has a greater size than the second spacing member 453. An end portion of the second spacing member 453 is spaced apart from the second display substrate 200 by a distance 'd'. The distance 'd' between the second spacing member 453 and the second display substrate 200 may be substantially the same as a thickness of the passivation layer 440.

The display panel includes the first and second spacing members 451 and 453 having different sizes so that a liquid crystal receiving space (dropping margin) for the liquid crystal layer 300 is increased. In addition, the second display substrate 200 has a substantially flat surface so that the first and second spacing members 451 and 453 may easily recover original position, although the first and second spacing members 451 and 453 are shifted by an externally provided compression. Thus, light leakage caused by the compression may be decreased.

The second pixel part P2 may be adjacent to the first pixel part P1. Alternatively, the second pixel part P2 may be spaced apart from the first pixel part P1. For example, the first and second spacing members 451 and 453 may be on adjacent pixel parts, respectively. Alternatively, the first and second spacing members 451 and 453 may be on the pixel parts spaced apart from each other. Although the first and second spacing members 451 and 453 are formed on the pixel parts spaced apart from each other, each of the first and second spacing members 451 and 453 is formed on a constant position in each of the pixel parts. For example, each of the first and second spacing members 451 and 453 may be formed on the storage electrode. Thus, credibility of testing the first and second spacing members is increased.

In FIG. 6, the first and second spacing members 451 and 453 are formed on the first display substrate of FIG. 5, which is an independent storage capacitor line type.

Alternatively, the first and second spacing members 451 and 453 may be formed on the second display substrate shown in FIGS. 3A and 3B, which is combined with the first display substrate 400 of FIG. 5. In another embodiment, the first and second metal electrodes ME1 and ME2 may be omitted as shown in FIG. 4, and the first and second spacing members may be formed on the first display substrate without the first and second metal patterns ME1 and ME2.

Figure 7:
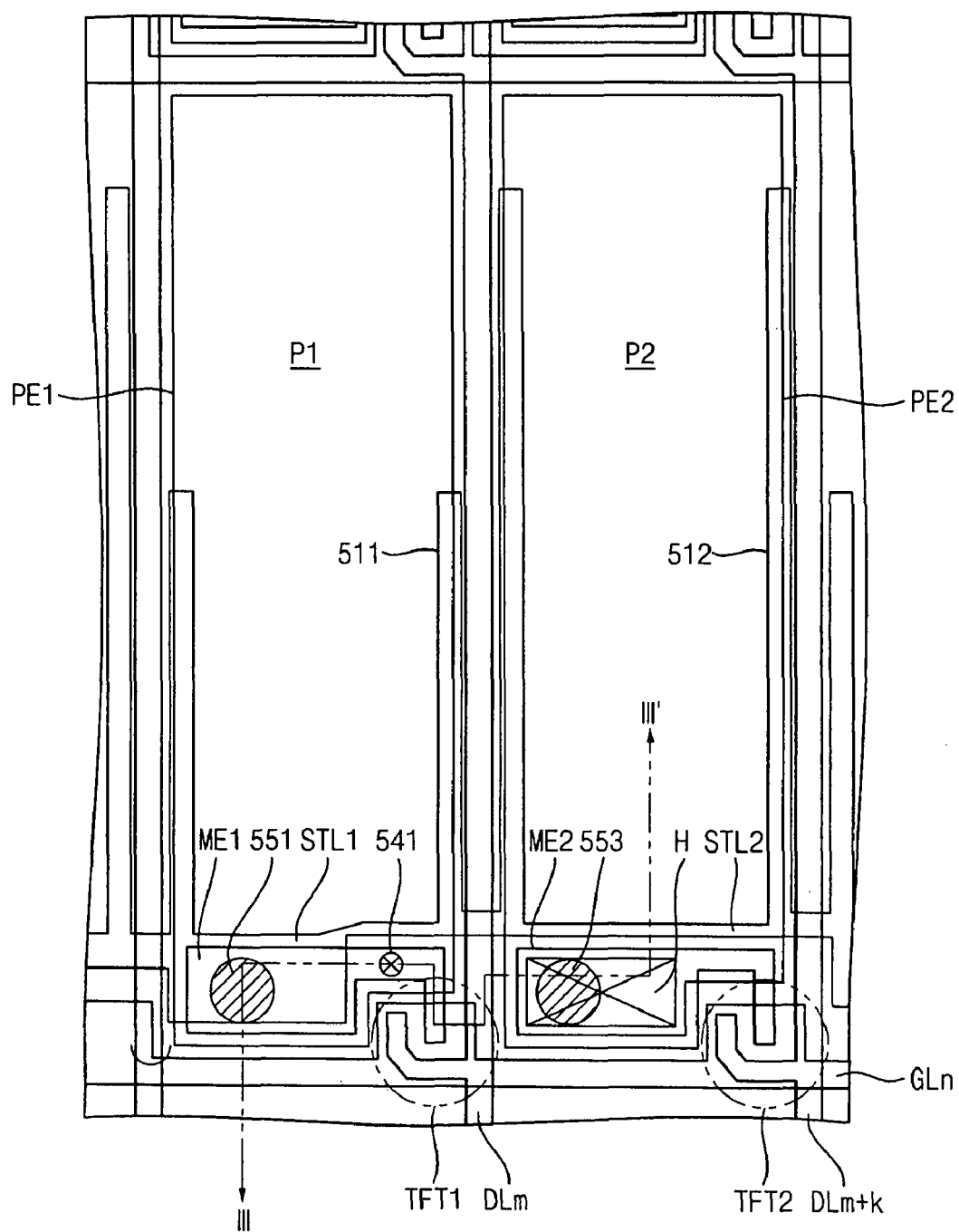
FIG. 7 is a plan view illustrating a display panel in accordance with another embodiment of the present invention.
Figure 8:
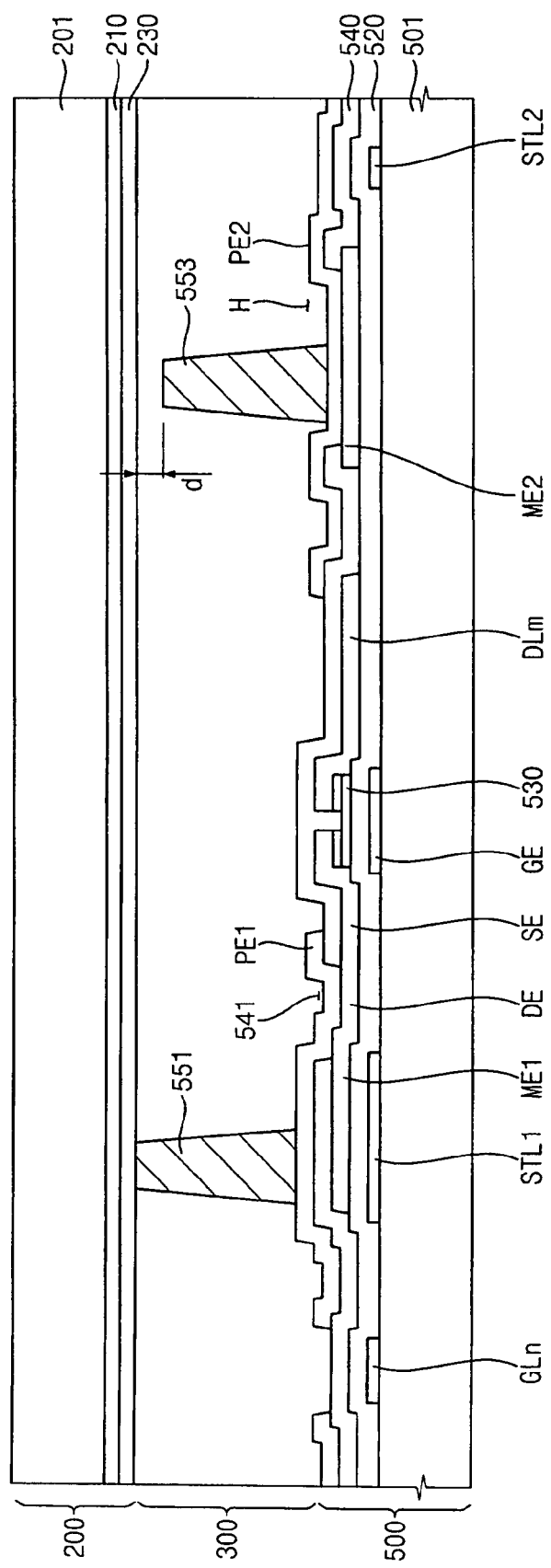
FIG. 8 is a cross-sectional view taken along a line III-III' shown in FIG. 7.

FIG. 7 is a plan view illustrating a display panel in accordance with another embodiment of the present invention. FIG. 8 is a cross-sectional view taken along a line III-III' shown in FIG. 7. The display panel of FIGS. 7 and 8 is the same as in FIGS. 1 and 2 except for a first display substrate. Thus, the same reference numerals will be used to refer to the same or like parts as those described in FIGS. 1 and 2 and any further explanation concerning the above elements is not required.

Referring to FIGS. 7 and 8, the first display substrate 500 includes a plurality of gate lines GLn-1 and GLn and a plurality of data lines DLm and DLm+k. The data lines DLm and DLm+k extend in a direction different from direction of the gate lines GLn-1 and GLn. A plurality of pixel regions is defined by the gate lines GLn-1 and GLn and the source lines DLm and DLm+k. A plurality of pixel parts is formed in the pixel regions. A plurality of storage capacitors of an independent storage capacitor line type is formed in the pixel parts, respectively.

For example, a first pixel part P1 is formed in a first pixel region. The first pixel part P1 includes a first switching element TFT1, a first storage electrode STL1, a first storage line 511, a first metal electrode ME1 and a first pixel electrode PE1.

The first switching element TFT1 includes a gate electrode GE, a source electrode SE and a drain electrode DE. The gate electrode GE is electrically connected to the n-th gate line GLn. The source electrode SE is electrically connected to the m-th data line DLm. The drain electrode DE is electrically connected to the first pixel electrode PE1. The gate electrode GE is a control electrode receiving a control signal. The source electrode SE is an input electrode receiving a data signal. The drain electrode DE is an output electrode through which an output signal corresponding to the data signal is output.

The first storage electrode STL1 is formed in the first pixel region adjacent to the n-th gate line GLn. The first storage line 511 is branched from the first storage electrode STL1, and extends substantially parallel with the data lines that define the first pixel region.

The first metal electrode ME1 extends from the drain electrode DE of the first switching element TFT1 and overlaps the first storage electrode STL1, and a passivation layer 540 is formed on the first metal electrode ME1. The first metal electrode ME1 is electrically connected to the first pixel electrode PE1 through a first contact hole 541 that is formed through the passivation layer 540. As will be appreciated by reference to FIG. 8 the first contact hole 541 is formed on a portion of the first metal electrode ME1 which does not overlap first storage electrode STL1.

A first storage capacitor of the first pixel part P1 includes the first storage electrode STL1, the first storage line 511, a gate insulating layer 520, the first metal electrode ME1, the passivation layer 540 and the first pixel electrode PE1.

A first spacing member 551 is formed on a portion of first pixel electrode PE1 that overlaps with the first metal electrode ME1. An end portion of the first spacing member 551 makes contact with the second display substrate to maintain a cell-gap between the first and second display substrates 500 and 200.

The second pixel part P2 is formed in a second pixel region. The second pixel part P2 includes a second switching element TFT2, a second storage electrode STL2, a second storage line 512, a second metal electrode ME2 and a second pixel electrode PE2.

The second switching element TFT2 includes a gate electrode electrically connected to the n-th gate line GLn, a source electrode electrically connected to the (m+k)-th data line DLm+k and a drain electrode electrically connected to the second pixel electrode PE2.

The second storage electrode STL2 is formed in a second pixel region adjacent to the n-th gate line GLn. The second storage line 512 is branched from the second storage electrode STL2, and is substantially parallel with the data lines defining the second pixel region.

The second metal electrode ME2 extends from the drain electrode of the second switching element TFT2 toward a region between the n-th gate line GLn and the second storage electrode STL2, and the second metal electrode ME2 is not overlapped with the second storage electrode STL2. The second metal electrode ME2 may be on substantially the same position as the first metal electrode ME1 in the second pixel region, and may have substantially the same size as the first metal electrode ME1. As will be appreciated by reference to FIG. 8, the second storage electrode STL2 has a smaller width than the first storage electrode STL1, and does not overlap with the second metal electrode ME2.

For example, an area of the second storage electrode STL2 is smaller than that of the first storage electrode STL1, and an area of the first storage line 511 is smaller than that of the second storage line 512 so that a capacitance of the first storage capacitor is substantially the same as that of the second storage capacitor.

A second storage capacitor of the second pixel part P2 includes the second storage electrode STL2, the second storage line 512, the gate insulating layer 520, the passivation layer 540 and the second pixel electrode PE2.

The passivation layer 540 is partially removed to form a recessed portion H on the second metal electrode ME2. The second pixel electrode PE2 is electrically connected to the second switching element TFT2 through the recessed portion H.

A second spacing member 553 is formed on the second pixel electrode PE2 formed in the recessed portion H. A size of the recessed portion H may be greater than a cross-section of the second spacing member 553. An end portion of the second spacing member 553 is spaced apart from the second display substrate 200 by a constant distance 'd'. The distance 'd' between the end portion of the second spacing member 553 and the second display substrate 200 may be substantially the same as a summation of a thickness of the passivation layer 540 and a thickness of the first storage electrode STL1. For example, the summation of the thickness of the passivation layer 540 and the thickness of the first storage electrode STL1 may be about 4000 Å.

According to the display panel of FIGS. 7 and 8, the display panel includes the first and second spacing members 551 and 553 having different heights to increase a liquid crystal receiving space (dropping margin) for forming the liquid crystal layer 300. In addition, the second display substrate 200 has substantially the flat surface so that the first and second spacing members 551 and 553 may easily recover original position, although the display panel is compressed to shift the first and second spacing members 551 and 553. Thus, light leakage caused by the compression is decreased.

According to the present invention, the first spacing member is formed on the passivation layer, and the second spacing member is formed on the recessed portion that is formed through the passivation layer so that the first and second spacing members have different heights from each other. Thus, liquid crystal dropping margin is increased.

In addition, the end portions of the first and second spacing members face the substantially flat surface so that the first and second spacing members may easily recover the original position, although the first and second spacing members are shifted by the compression. Thus, the light leakage caused by the compression is decreased.

Furthermore, the heights of the first display substrate on which the first and second spacing members are formed are adjusted so that the heights of the first and second spacing members are different from each other, although the distance between the upper and lower surfaces of each of the first and second spacing members is constant. Thus, the credibility of the display panel is improved.

This invention has been described with reference to the example embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A display panel comprising:
    a first display substrate including:
        a plurality of gate lines extending in a first direction;
        a plurality of data lines extending in a second, different direction;
        a first switching element electrically connected to an n-th gate line and an m-th source line, in which m and n are natural numbers;
        a first metal electrode extended from an output electrode of the first switching element;
        a second switching element electrically connected to the n-th gate line and an (m+k)-th source line, in which k is a natural number;
        a second metal electrode extended from an output electrode of the second switching element; and
        a first insulating layer covering the first metal electrode, the first insulating layer having a recessed portion on the second metal electrode;
    a second display substrate combined with the first display substrate to interpose a liquid crystal layer;
    a first spacing member formed in a region corresponding to the first metal electrode to maintain a cell-gap between the first and second display substrates; and
    a second spacing member formed in a region corresponding to the recessed portion, an end portion of the second spacing member being spaced apart from the first display substrate or the second display substrate by a constant distance.

2. The display panel of claim 1, wherein the first display substrate further comprises:
    a first storage electrode overlapped with the first metal electrode under the first metal electrode; and
    a second storage electrode formed from a layer under the second metal electrode, the second storage electrode being not overlapped with the second storage electrode.

3. The display panel of claim 2, further comprising a second insulating layer formed under the first insulating layer to cover the first and second storage electrodes.

4. The display panel of claim 3, further comprising:
    a first storage line electrically connected to the first storage electrode, the first storage line being substantially parallel with the m-th source line; and
    a second storage line electrically connected to the second storage electrode, the second storage line being substantially parallel with the (m+k)-th source line.

5. The display panel of claim 2, wherein the constant distance is substantially the same as a summation of a thickness of the first insulating layer and a thickness of the first storage electrode.

6. A display substrate comprising:
    a base substrate including a plurality of gate lines extending in a first direction and a plurality of data lines extending in a second, different direction;
    a first switching element electrically connected to an n-th gate line and an m-th source line, in which m and n are natural numbers;
    a first metal electrode extended from an output electrode of the first switching element;
    a second switching element electrically connected to the n-th gate line and an (m+k)-th source line, in which k is a natural number;
    a second metal electrode electrically connected to an output electrode of the second switching element;
    a first insulating layer covering the first metal electrode and a portion of the second metal electrode, an uncovered portion of second metal electrode defining a recessed portion associated with the second metal electrode;
    a first spacing member on the first insulating layer corresponding to the first metal electrode; and
    a second spacing member positioned in the recessed portion, wherein n, m and k are natural numbers.

7. The display substrate of claim 6, further comprising:
    a first storage electrode formed from a layer disposed under the first metal electrode, the first storage electrode being overlapped with the first metal electrode; and
    a second storage electrode formed from the layer disposed under the second metal electrode, the second storage electrode being not overlapped with the second metal electrode.

8. The display substrate of claim 7, further comprising a second insulating layer under the first insulating layer to cover the first and second storage electrodes.

9. The display substrate of claim 8, further comprising: a first storage line extended from the first storage electrode, the first storage line being extended substantially parallel with the m-th source line; and a second storage line extended from the second storage electrode, the second storage line being extended substantially parallel with the (m+k)-th source line.

10. A display substrate comprising:
    a base substrate including a first pixel region and a second pixel region that are defined by a plurality of gate lines extending in a first direction and a plurality of source lines extending in a second direction;
    a first storage electrode associated with the first pixel region;
    a second storage electrode associated with the second pixel region;

a first insulating layer covering the first storage electrode and partially covering the second storage electrode so as to form a covered portion and an open portion of the second storage electrode;

a first spacing member on the first insulating layer corresponding to the first storage electrode; and a second spacing member positioned above the open portion of the second storage electrode.

11. The display substrate of claim 10, further comprising a second insulating layer formed under the first insulating layer to cover the first and second storage electrodes.

12. The display substrate of claim 11, further comprising:

a first metal electrode interposed between the first and second insulating layers, the first metal electrode overlapping at least a portion of the first storage electrode; and a second metal electrode on the second insulating layer, the second metal electrode overlapping with at least a portion of the second storage electrode.

13. The display substrate of claim 12, wherein the first insulating layer on the second metal electrode is partially removed to form the open portion of the second storage electrode.

14. The display substrate of claim 12, further comprising:

a first switching element electrically connected to an n-th gate line and an m-th source line; and a second switching element electrically connected to the n-th gate line and an (m+k)-th source line, wherein n, m and k are natural numbers.

15. The display substrate of claim 14, wherein the first metal electrode is electrically connected to an output electrode of the first switching element, and the second metal electrode is electrically connected to an output electrode of the second switching element.

16. The display substrate of claim 15, wherein the first and second storage electrodes are electrically connected to a common line.

17. The display substrate of claim 14, wherein the first and second storage electrodes are extended from an (n−1)-th gate line.

18. A display panel comprising:

a first display substrate including a plurality of pixel regions defined by a plurality of gate lines and a plurality of data lines, the first display substrate further including a first storage electrode in a first pixel region, a second storage electrode in a second pixel region, and a first insulating layer covering the first storage electrode and partially covering the second storage electrode, thereby forming a covered portion and an open portion of the second storage electrode;

a second display substrate positioned in spaced apart relationship to the first display substrate;

a liquid crystal layer interposed between the first and second display substrates;

a first spacing member on the first storage electrode to maintain a cell-gap between the first and second substrates; and a second spacing member in a region corresponding to the open portion of the second storage electrode, an end portion of the second spacing member being spaced apart from the first display substrate or the second display substrate by a constant distance.

19. The display panel of claim 18, wherein the first display substrate further comprises a second insulating layer formed under the first insulating layer to cover the first and second storage electrodes.

20. The display panel of claim 19, further comprising:

a first metal electrode overlapping the first storage electrode, the first metal electrode being interposed between the first and second insulating layers; and a second metal electrode overlapping the second storage electrode, the second metal electrode being on the second insulating layer.

21. The display panel of claim 20, wherein the first insulating layer corresponding to the second metal electrode is partially removed to form the open portion of the second storage electrode.

22. The display panel of claim 20, wherein the first display substrate further comprises:

a first switching element electrically connected to an n-th gate line and an m-th source line; and a second switching element electrically connected to the n-th gate line and an (m+k)-th source line, wherein n, m and k are natural numbers.

23. The display panel of claim 22, wherein the first metal electrode is electrically connected to an output electrode of the first switching element, and the second metal electrode is electrically connected to an output electrode of the second switching element.

24. The display panel of claim 23, wherein the first and second storage electrodes of the first display substrate are electrically connected to a common line.

25. The display panel of claim 22, wherein the first and second storage electrodes are extended from an (n−1)-th gate line.

26. The display panel of claim 18, wherein the first and second spacing members are formed on the first display substrate.

27. The display panel of claim 18, wherein the first and second spacing members are formed on the second display substrate.

28. The display panel of claim 18, wherein the constant distance is substantially the same as a thickness of the first insulating layer.

* * * * *